United States Patent
Anderson et al.

(10) Patent No.: US 9,580,622 B2
(45) Date of Patent: Feb. 28, 2017

(54) CROSSLINKABLE COMPOSITION, A METHOD OF MAKING THE SAME AND A CROSSLINKED COMPOSITION PRODUCED THEREFROM

(71) Applicant: Dow Global Technologies LLC, Midland, MI (US)

(72) Inventors: Jeff R. Anderson, Midland, MI (US); Gary E. Spilman, Midland, MI (US); Paul J. Popa, Auburn, MI (US); John N. Argyropoulos, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 150 days.

(21) Appl. No.: 14/556,286

(22) Filed: Dec. 1, 2014

(65) Prior Publication Data

US 2015/0166828 A1  Jun. 18, 2015

Related U.S. Application Data

(60) Provisional application No. 61/916,438, filed on Dec. 16, 2013.

(51) Int. Cl.
| | |
|---|---|
| *C09D 175/04* | (2006.01) |
| *C09D 175/16* | (2006.01) |
| *C09D 133/06* | (2006.01) |
| *C08F 8/30* | (2006.01) |
| *C08G 16/02* | (2006.01) |
| *C08G 16/06* | (2006.01) |
| *C09D 161/00* | (2006.01) |

(52) U.S. Cl.
CPC .............. *C09D 175/04* (2013.01); *C08F 8/30* (2013.01); *C08G 16/0225* (2013.01); *C08G 16/06* (2013.01); *C09D 133/066* (2013.01); *C09D 161/00* (2013.01); *C09D 175/16* (2013.01); *Y10T 428/31551* (2015.04); *Y10T 428/31591* (2015.04); *Y10T 428/31598* (2015.04); *Y10T 428/31605* (2015.04)

(58) Field of Classification Search
None
See application file for complete search history.

(56) References Cited

U.S. PATENT DOCUMENTS

| | | | |
|---|---|---|---|
| 6,930,124 B2 | 8/2005 | Combeau et al. | |
| 7,632,882 B2* | 12/2009 | Lenges | C08G 18/3228 524/186 |
| 2011/0313091 A1* | 12/2011 | Argyropoulos | C08G 18/3831 524/391 |
| 2013/0165581 A1 | 6/2013 | Argyropoulos et al. | |
| 2013/0172472 A1 | 7/2013 | Greyson et al. | |

FOREIGN PATENT DOCUMENTS

| | | |
|---|---|---|
| EP | 2397506 | 12/2011 |
| WO | 9928365 | 6/1999 |
| WO | 2007060091 | 5/2007 |

OTHER PUBLICATIONS

Japanese Office Action dated Nov. 20, 2015; from Japanese counterpart Application No. 2014-228944.
EP Office Action dated Apr. 23, 2015; from EP counterpart Application No. 14193167.5.
EP Response to Office Action dated Oct. 2, 3015; from EP counterpart Application No. 14193167.5.

* cited by examiner

*Primary Examiner* — Randy Gulakowski
*Assistant Examiner* — Christopher M Rodd

(57) ABSTRACT

A crosslinkable composition comprising: (i) one or more polycarbamates; (ii) one or more polyaldehydes; (iii) one or more polyols; and (iv) an acid catalyst is provided. Further provided are a method for making the crosslinkable composition, a crosslinked composition made therefrom, a coating comprising the crosslinked composition and articles comprising a substrate and the coating.

12 Claims, No Drawings

CROSSLINKABLE COMPOSITION, A METHOD OF MAKING THE SAME AND A CROSSLINKED COMPOSITION PRODUCED THEREFROM

FIELD OF INVENTION

The instant invention relates to a crosslinkable composition, a method of making the same and a crosslinked composition produced therefrom.

BACKGROUND OF THE INVENTION

In some situations the crosslinking between a polycarbamate and a polyaldehyde may produce coating films or composites that are too brittle or that may have reduced crosslinking. However the use of polyaldehyde crosslinkers provide other desirable characteristics.

Non-reactive plasticizers have been used to soften or improve flexibility. However, plasticizers are migratory and can escape from the dried material.

Therefore, a crosslinkable composition using polyaldehyde crosslinkers which exhibits improved coating properties would be desirable.

SUMMARY OF THE INVENTION

The instant invention is a crosslinkable composition, a method of making the same and a crosslinked composition produced therefrom.

In one embodiment, the instant invention provides a crosslinkable composition comprising: (i) one or more polycarbamates; (ii) one or more polyaldehydes; and (iii) one or more polyols.

DETAILED DESCRIPTION OF THE INVENTION

The instant invention is a crosslinkable composition, a method of making the same and a crosslinked composition produced therefrom.

The crosslinkable composition according to the present invention comprises (i) one or more polycarbamates; (ii) one or more polyaldehydes; (iii) one or more polyols; and (iv) an acid catalyst.

In an alternative embodiment, the instant invention further provides a method for producing a composition comprising selecting (i) one or more polycarbamates; selecting (ii) one or more polyaldehydes; selecting (iii) one or more polyols; and mixing components (i)-(iii) in any order.

In another alternative embodiment, the instant invention further provides a crosslinked composition produced by curing the crosslinkable composition of any embodiment disclosed herein, wherein the curing occurs at a temperature from 0 to 80° C.

In an alternative embodiment, the instant invention provides a crosslinkable composition, method of producing the same, a crosslinked composition made therefrom, a coating made from the crosslinked composition and coated articles in accordance with any of the embodiments disclosed herein, except that the crosslinkable composition further comprises a polyisocyanate. As used herein, polyisocyanates include di-, tri- and higher isocyanates having a functionality equal to or greater than 2. Examples of suitable polyisocyanates include hexamethylene diisocyante (HDI), isophorone diisocyanate (IPDI), and the biurets or trimers of HDI or IPDI. A preferred polyisocyante is the trimer of HDI trimer, commercially available as DESMODUR N 3300A from Bayer Corporation.

Polycarbamates

The polycarbamate used in embodiments of the present invention may have an average of 2.0 or more carbamate groups, or an average of three or more carbamate groups, or an average of four or more carbamate groups. The carbamate functionality is equal to the number average molecular weight of the polycarbamate divided by the carbamate equivalent weight (CEW). The number average molecular weight of the polycarbamate can be determined by gel permeation chromatography (GPC). The carbamate equivalent weight (CEW) is calculated using the following equation 1.

$$CEW = [OH\ EW_{polyol} + (43 \times \text{Carbamate Conversion})] \div \text{Carbamate Conversion} \quad (eq.\ 1)$$

For equation 1, OH $EW_{polyol}$ is the hydroxyl equivalent weight of the polyol and carbamate conversion is calculated using the following equation 2.

$$\text{Carbamate Conversion} = (OH\#_{polyol} - OH\#_{polycarbamate}) \div OH\#_{polyol} \quad (eq.\ 2)$$

For equation 2, OH $\#_{polyol}$ and OH $\#_{polycarbamate}$ are the hydroxyl numbers of the polyol and the polycarbamate, respectively. Hydroxyl number is determined by following ASTM D4274-05 (Standard Test Methods for Testing Polyurethane Raw Materials: Determination of Hydroxyl Numbers of Polyols, 2005) and is expressed as number of milligrams of potassium hydroxide (KOH) per gram of test substance (mg KOH/g).

The polycarbamate can be acyclic, straight-chained or branched; cyclic and nonaromatic; cyclic and aromatic, or a combination thereof. In some embodiments the polycarbamate comprises one or more acyclic, straight-chained or branched polycarbamates. For example, the polycarbamate may consist essentially of one or more acyclic, straight-chained or branched polycarbamates.

In one embodiment, the polycarbamate consists essentially of carbon, hydrogen, nitrogen, and oxygen atoms. In yet another embodiment, the polycarbamate consists of carbon, hydrogen, nitrogen, and oxygen atoms, wherein each nitrogen and oxygen atom is the nitrogen or oxygen atom of one of the two or more carbamate groups of the polycarbamate.

The polycarbamate may be prepared by (a) reacting a polyol with methyl carbamate or urea to give the polycarbamate; (b) reacting a polyisocyanate with a hydroxy($C_2$-$C_{20}$)alkyl-carbamate to give the polycarbamate; or (c) reacting the hydroxy($C_2$-$C_{20}$) alkyl-carbamate with methacrylic anhydride to give a 2-carbamoylalkyl methacrylate, and then polymerizing the 2-carbamoylalkyl methacrylate with one or more acrylic acid monomers to give the polycarbamate as a polyacrylic-based polycarbamate. Examples of acrylic monomers are acrylic acid, ($C_1$-$C_{20}$)alkylacrylic acid (e.g., the ($C_1$)alkylacrylic acid is methacrylic acid), and ($C_1$-$C_{20}$) alkyl acrylate (i.e., acrylic acid ($C_1$-$C_{20}$)alkyl ester, e.g., ($C_1$)alkyl acrylate means methyl acrylate). Not shown in Scheme (c), other olefinic monomers (e.g., styrene) can also be employed along with the acrylic monomer, thereby preparing the polycarbamate as a poly(acrylic other olefinic monomer)-based polycarbamate.

The polycarbamates produced in (a) to (c) typically will have different structures. Examples of these reactions are illustrated graphically below in respective Schemes (a) to (c):

Scheme (a):

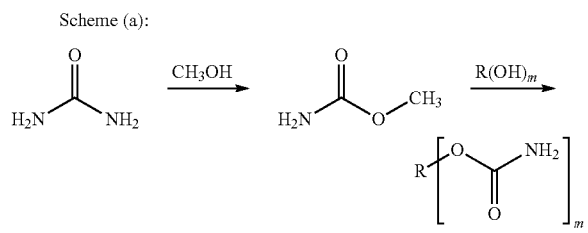

wherein m is as defined for Scheme (a) and R(OH)$_m$, wherein is 2 or greater.

Scheme (b):

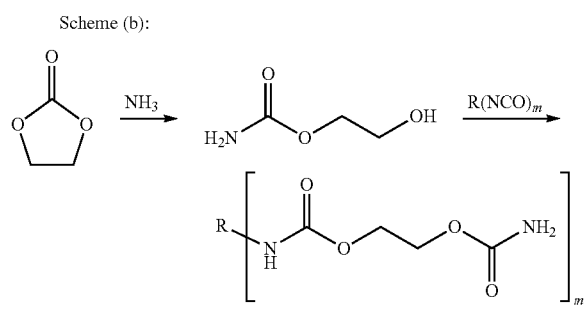

wherein m is an integer of from 2 or greater. Preferably m is an integer of from 2 to 20. In some embodiments m is 2 or 3.

Scheme (c):

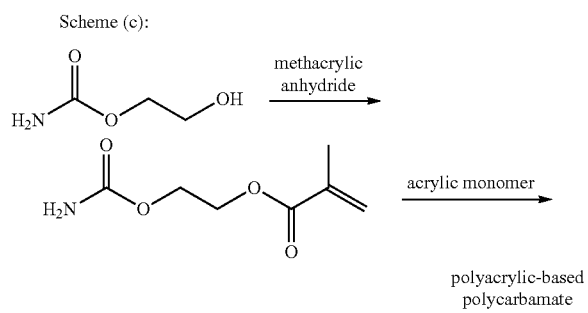

polyacrylic-based polycarbamate

In a preferred embodiment, each of the one or more acyclic, straight-chain or branched polycarbamates is prepared by reacting one or more polyols with an unsubstituted carbamic acid alkyl ester or urea to yield the one or more acyclic, straight-chain or branched polycarbamates. Suitable polyols may be (meth)acrylic polyols (i.e., a methacrylic or acrylic polyol), polyalkylene polyols, polyether polyols (e.g., a poly(oxyalkylene) such as a poly(oxyethylene), such as a poly(ethylene glycol), polyester polyols, or polycarbonate polyols.

In another embodiment, the polycarbamate comprises one or more cyclic, nonaromatic polycarbamates. In another embodiment, the polycarbamate consists essentially of one or more cyclic, nonaromatic polycarbamates.

In some embodiments each of the one or more cyclic, nonaromatic polycarbamates is a N,N',N''-trisubstituted-cyanuric acid derivative, wherein each substituent thereof independently is of formula: H$_2$C=O)O—(CH$_2$)$_n$—OC(=O)NH—CH$_2$—((C$_3$-C$_{12}$)cycloalkyl)CH$_2$—, wherein n is an integer of from 2 to 20. Preferably each n independently is an integer of from 2 to 12 and each cyclohexylene independently is a 1,3-cyclohexylene or 1,4-cyclohexylene.

In one embodiment, the polycarbamate is substantially isocyanate free. Presence or absence of molecules containing isocyanate groups can be readily determined by Fourier Transform Infrared (FT-IR) spectroscopy or carbon-13 nuclear magnetic resonance ($^{13}$C-NMR) spectroscopy. Where an isocyanate group-containing reactant is employed, the polycarbamate prepared therefrom is titrated or "quenched" by an isocyanate quenching agent to convert any residual isocyanate groups to carbamates or amines Examples of compounds that could be used as an isocyanate quenching agent are water, sodium hydroxide, methanol, sodium methoxide, and a polyol.

Polyaldehydes

The polyaldehyde used in embodiments of the present invention may have two aldehyde groups (also referred to herein as a dialdehyde), wherein at least one of the two aldehyde groups reacts with two carbamate groups from the same polyurethane chain (molecule) so as to form the crosslinked polyurethane comprising a plurality of geminal bis(urethane) groups. The two aldehyde groups of the dialdehyde may react with two carbamate groups from two different polyurethane chains so as to form the crosslinked polyurethane comprising a plurality of geminal bis(urethane) groups. Suitable polyaldehydes of the present invention have two, three, four or more aldehyde groups. A polyaldehyde having three aldehyde groups is also referred to herein as a trialdehyde.

The polyaldehyde can include any such molecule having from 2 to 20 carbon atoms or it can have more than 20 carbon atoms, i.e, up to 100, with the proviso that polyaldehydes having more than 20 carbon atoms will have at least one aldehyde group for every 11 carbon atoms, for example, at least one aldehyde group for every 10 carbon atoms. The polyaldehyde can be a cyclic, straight-chained or branched; cyclic and nonaromatic; cyclic and aromatic (e.g., 3-formylbenzaldehyde), or a combination thereof.

The polyaldehyde of the present invention is substantially formaldehyde free. As used herein, the term "substantially formaldehyde free" means that the multicomponent composition or ambient temperature curable composition comprises less than 500 ppm of free formaldehyde, based on the total weight of polyaldehyde solids, preferably, less than 300 ppm, or, more preferably, less than 200 ppm. The compositions of the present invention contain so little of resins made from formaldehyde, such as aminoplasts and phenol or resole formaldehyde condensates, that the amount of free formaldehyde in such compositions meets the definition of "substantially formaldehyde free".

In another embodiment, the polyaldehyde of the present invention comprises one or more cyclic, nonaromatic polyaldehydes or one or more aromatic polyaldehydes. For example, the polyaldehyde comprises one or more cyclic, nonaromatic polyaldehydes having from 3 to 20 ring carbon atoms, and may consist essentially of one or more cyclic, nonaromatic polyaldehydes having from 3 to 20 ring carbon atoms.

In another embodiment, each cyclic, nonaromatic polyaldehyde in the multicomponent composition independently has from 5 to 12 ring carbon atoms, and, even more preferably, is a mixture of (cis,trans)-1,4-cyclohexanedicarboxaldehydes and (cis,trans)-1,3-cyclohexanedicarboxaldehydes.

According to one embodiment of the present invention, the polyaldehyde may comprise one or more acyclic, straight-chain or branched polyaldehyde having from 2 to 16 carbon atoms.

In another embodiment, each of the one or more acyclic, straight-chain or branched polyaldehydes having 16 carbon atoms or more is prepared by hydroformylating a substantially water insoluble multi-olefin-containing compound that is derived from a fatty acid ester or, more preferably, a seed oil. For example, each of the one or more acyclic, straight-chain or branched polyaldehydes having 16 carbon atoms or more is prepared by hydroformylating a multi-olefin-containing oligomer or polymer. Preferably, the multi-olefin-containing compound that is derived from the seed oil is a multi-olefin-containing fatty acid triglyceride having 48 carbon atoms or more.

Examples of suitable cyclic polyaldehydes are trans-1,3-cyclohexanedicarboxaldehyde; cis-1,3-cyclohexanedicarboxaldehyde; trans-1,4-cyclohexanedicarboxaldehyde; cis-1,4-cyclohexanedicarboxaldehyde; a mixture of 1,3-cyclohexanedicarboxaldehydes and 1,4-cyclohexanedicarboxaldehydes, preferably a 1-to-1 mixture thereof; exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; endo,endo-2,6-norbornanedicarboxaldehyde product (endo and exo mixture); 3-(3-formylcyclohexyl)propanal; 3-(4-formylcyclohexyl)propanal; 2-(3-formylcyclohexyl)propanal; 2-(4-formylcyclohexyl)propanal; and cyclododecane-1,4,8-tricarbaldehyde. The trans-1,3-cyclohexanedicarboxaldehyde; cis-1,3-cyclohexanedicarboxaldehyde; trans-1,4-cyclohexanedicarboxaldehyde; and cis-1,4-cyclohexanedicarboxaldehyde can be prepared by a process comprising hydroformylating 3-cyclohexene-1-carboxaldehyde using the hydroformylating conditions described later. The 1:1 mixture of 1,3- and 1,4-cyclohexanedicarboxaldehydes can be prepared by a process comprising reacting acrolein and 1,3-butadiene in a Diels-Alder reaction to give 3-cyclohexenecarboxaldehyde (also called 1,2,3,6-tetrahydrobenzaldehyde), and hydroformylating the 3-cyclohexenecarboxaldehyde using the hydroformylating conditions described later. The exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; and endo,endo-2,6-norbornanedicarboxaldehyde product (endo and exo mixture) can be prepared by a process comprising reacting acrolein and cyclopentadiene in a Diels-Alder reaction to give a 2-norbornene-5-carboxaldehyde, and hydroformylating the 2-norbornene-5-carboxaldehyde using the hydroformylating conditions described later. The 3-(3-formylcyclohexyl)propanal; 3-(4-formylcyclohexyl)propanal; 2-(3-formylcyclohexyl)propanal; and 2-(4-formylcyclohexyl)propanal can be prepared by a process comprising hydroformylating vinyl cyclohexene. The cyclododecane-1,4,8-tricarbaldehyde can be prepared by a process comprising trimerizing 1,3-butadiene to give 1,4,8-cyclododecatriene, and hydroformylating the 1,4,8-cyclododecatriene using the hydroformylating conditions described later.

The polyaldehyde of the present invention can be unblocked and unprotected or blocked or protected. Blocked or protected polyaldehydes can be formed by reacting an unblocked and unprotected polyaldehyde with a suitable blocking or protecting group. Examples of protecting or blocking groups for aldehyde groups are bisulfites (e.g., from reaction of the polyaldehyde with sodium bisulfite), dioxolanes (e.g., from reaction of the polyaldehyde with ethylene glycol), oximes (e.g., from reaction of the polyaldehyde with hydroxylamine), imines (e.g., from reaction of the polyaldehyde with methylamine), and oxazolidines (e.g., from reaction of the polyaldehyde with a 2-aminoethanol).

Preferred aldehyde protecting groups are, and preferred protected polyaldehydes comprise, a hydrated group (>C(OH)$_2$), hemiacetal, acetal, or imine. These preferred protected polyaldehydes can be prepared by respectively reacting the polyaldehyde with water; one mole equivalent of an alkanol (e.g., methanol or ethanol); two mole equivalents of the alkanol; or ammonia or a primary amine (e.g., methylamine). The hemiacetal, acetal, or imine protecting group can, if desired, be removed by a deprotection such as hydrolysis to give back the unprotected form of the polyaldehyde. Such aldehyde protecting or blocking groups and formation and removal (i.e., deprotection) is taught, for example, in U.S. Pat. No. 6,177,514, the disclosure of which is incorporated herein by reference in its entirety.

Preferably, the polyaldehyde is stable in neat form (i.e., does not materially self-polymerize) and, more preferably, is substantially water insoluble and is stable in neat form.

The polyaldehydes of the present invention can be prepared by any suitable means, including oxidation of corresponding polyols, and via batchwise and continuous processes for preparing the polyaldehydes. Preferably the polyaldehyde is prepared by hydroformylating a substantially water-insoluble mono-olefin containing aldehyde compound, substantially water-insoluble multi-olefin containing aldehyde compound, or a substantially water-insoluble multi-olefin containing starting compound (collectively referred to herein for convenience as substantially water-insoluble olefin-containing compounds). The hydroformylation step can be performed by any conventional means such as with hydrogen gas, carbon monoxide, and the olefin-containing starting compound. The hydroformylating step is performed, for example, in a manner as generally described in U.S. Pat. No. 6,252,121, the disclosure of which is incorporated herein by reference in its entirety.

Preparations of the polyaldehyde can optionally further comprise reversibly blocking or protecting aldehyde groups of the polyaldehydes with aldehyde blocking or protecting groups to give a blocked or protected polyaldehyde, respectively. The protected polyaldehyde can be employed in place of or in addition to the polyaldehyde in the invention multicomponent composition. In such embodiments, the invention process of preparing the invention crosslinked polyurethane can employ the protected polyaldehyde in place of or in addition to the polyaldehyde and the process can comprise curing the polycarbamate directly with the protected polyaldehyde or the process can optionally further comprise a step of deprotecting the protected polyaldehyde so as to obtain the polyaldehyde in situ, and curing the same with the polycarbamate, as described herein.

Preferably, the polyaldehydes of the present invention are mixtures comprising two or more of trans-1,3-cyclohexanedicarboxaldehyde, cis-1,3-cyclohexanedicarboxaldehyde, trans-1,4-cyclohexanedicarboxaldehyde and cis-1,4-cyclohexanedicarboxaldehyde, or protected or blocked forms of these polyaldehydes.

As used herein, the term polyols means any compound having two or more hydroxyl groups, specifically including those with two hydroxyl groups (diols) and with three hydroxyl groups (triols). The term polyols further includes linear polycarbonate polyesters. In one embodiment, the polyols are selected from the group consisting of diols wherein the hydroxyl groups are not in a 1,2- or 1,3-configuration. In yet another embodiment, the polyol is one or more selected from the group consisting of 1,4-butanediol, 1,5-pentanediol, 1,6-hexanediol, 1,3-cyclohexanedimethanol,4-cyclohexanedimethanol and mixtures of these diols.

In yet another embodiment, the polyol is selected from the group consisting of polyether diols, polyester diols and polycarbonate diols. In another embodiment, the polyether diols, polyester diols and polycarbonate diols have a glass transition temperature, Tg, from −60 to 10° C. All individual values and subranges from −60 to 10° C. are included herein and disclosed herein; for example, the Tg of the polyether diols, polyester diols and polycarbonate diols can range from a lower limit of −60, −50, −40, −30, −20, −10, or 0° C. to an upper limit of −55, −45, −35, −25, −15, −5, 0, 5 or 10° C. For example, the Tg of the polyether diols, polyester diols and polycarbonate diols can range from −60 to 10° C., or in the alternative, from −50 to −20° C., or in the alternative, from −40 to 0° C., or in the alternative, from −45 to 10° C., or in the alternative, from −30 to −10° C.

Curing Conditions

The crosslinkable composition may be crosslinked, or cured, at ambient temperatures. In one embodiment of the invention, the ambient curing temperature ranges from 0 to 80° C. All individual values and subranges from 0 to 80° C. are included herein and disclosed herein; for example the curing temperature can range from a lower limit of 0, 10, 20, 30, 40, 50, 60 or 70° C. to an upper limit of 5, 15, 25, 35, 45, 55, 65, 75 or 80° C. For example, the crosslinkable composition may be curable at a temperature from 0 to 80° C., or in the alternative, from 0 to 40° C., or in the alternative, from 50 to 80° C., or in the alternative, from 20 to 50° C. In one embodiment, a minimum effective curing temperature is a minimum temperature effective for curing the crosslinkable composition to yield the crosslinked composition within 7 days. In a particular embodiment, despite curing the crosslinkable composition at ambient temperature, the inventive method prepares the crosslinked composition within a curing time period of 7 days or shorter. All individual values and subranges from 7 days or shorter are included herein and disclosed herein. For example, the curing period may be 7 days or less, or in the alternative, 5 days or shorter, or in the alternative, 24 hours or shorter, or in the alternative, 12 hours or shorter, or in the alternative, 1 hour or shorter.

In an alternative embodiment, the instant invention provides a crosslinkable composition, method of producing the same, a crosslinked composition made therefrom, a coating made from the crosslinked composition and coated articles in accordance with any of the embodiments disclosed herein, except that the crosslinkable composition further comprises an acid catalyst. In one embodiment, the acid catalyst is used in an amount of from 0.001 wt % to 10 wt % of the crosslinkable composition, based on the total weight of solids in the composition, or in the alternative, from 0.01 wt % to 5 wt % thereof, or in the alternative, from 0.1 wt % to 2 wt % thereof. Such amounts of the acid catalyst are referred to herein as "effective amounts" of the acid catalyst.

Any acid catalyst suitable for increasing a rate of reaction of a carbamate group (—O—C(═O)—NH$_2$) with an aldehyde group (—C(═O)H) can be employed as the triggering agent. Examples of triggering agents are Lewis acids (e.g., boron trifluoride etherate) and protic acids (i.e., Bronsted acids). Preferably, the triggering agent comprises a protic acid characterizable as having a pKa of 6 or lower, wherein pKa is negative base-10 logarithm of acid dissociation constant, Ka, of the protic acid. Thus, the ambient temperature curable composition of the present invention has a pH of 7.0, or less, preferably, from pH 3 to pH<6. A preferred protic acid is an inorganic protic acid or organic protic acid. A preferred inorganic protic acid is phosphoric acid or sulfuric acid. A preferred organic protic acid is carboxylic acid, phosphonic acid, or sulfonic acid. A preferred carboxylic acid is acetic acid, trifluoroacetic acid, propionic acid, or a dicarboxylic acid. A preferred phosphonic acid is methylphosphonic acid. A preferred sulfonic acid is methanesulfonic acid, benzenesulfonic acid, a camphorsulfonic acid; para-toluenesulfonic acid, or dodecylbenzenesulfonic acid. Examples of suitable Lewis acid curing catalysts are AlCl$_3$; benzyltriethylammonium chloride (TEBAC); Cu(O$_3$SCF$_3$)$_2$; (CH$_3$)$_2$BrS$^+$Br$^-$; FeCl$_3$ (e.g., FeCl$_3$6H$_2$O); HBF$_4$; BF$_3$3O(CH$_2$CH$_3$)$_2$; TiCl$_4$; 5 nCl$_4$; CrCl$_2$; NiCl$_2$; and Pd(OC(O)CH$_3$)$_2$.

The acid catalyst can be unsupported (no solid support) or supported, i.e. covalently bonded to a solid support. Examples of supported triggering agents are supported curing catalysts such as supported acid catalysts such as acid (H$^+$) forms of cation exchange-type polymer resins (e.g., ethanesulfonic acid, 2-[1-[difluoro[(1,2,2-trifluoroethenyl) oxy]methyl]-1,2,2,2-tetrafluoroe thoxy]-1,1,2,2-tetrafluoro-, polymer with 1,1,2,2-tetrafluoroethene sold under trade name NAFION NR50 (E. I. du Pont de Nemours & Co., Inc., Wilmington, Del.) and ethenylbenzenesulfonic acid polymer with diethenylbenzene sold as AMBERLYST15 (Rohm and Haas Co., subsidiary of The Dow Chemical Company, Midland, Mich., USA.).

In an alternative embodiment, the instant invention provides a crosslinkable composition, method of producing the same, a crosslinked composition made therefrom, a coating made from the crosslinked composition and coated articles in accordance with any of the embodiments disclosed herein, except that the articles are one or more selected from the group consisting of composites, windblades, coils, and metal parts. Embodiments of the coating of the present invention is useful on any substrate, including substrates made from metals, composites, plastics, wood, or concrete. In a particular embodiment, the coating is applied in applications wherein flexibility is a beneficial characteristic.

The invention provides a method of making a crosslinkable composition comprising: selecting (i) one or more polycarbamates; selecting (ii) one or more polyaldehydes; selecting (iii) one or more selected from the group consisting of polyols; and mixing components (i)-(iii) in any order. In a particular embodiment of the method of making a crosslinkable composition, the one or more polyaldehydes are mixed with the one or more polyols prior to addition to the one or more polycarbamates.

EXAMPLES

The following examples illustrate the present invention but are not intended to limit the scope of the invention.

Formulation Components

Components used in the following Inventive and Comparative Examples include the following:

TI-PURE R-900 is titanium dioxide commercially available from E. I. du Pont de Nemours and Company (Wilmington, Del., USA) (pigment);

OPTIWHITE is calcined aluminum silicate commercially available from Burgess Pigment Company (Sandersville, Ga. USA) (filler);

ACEMATT TS100 is silica commercially available from Evonik Industries (Essen, North Rhine-Westphalia, Germany) (filler);

CIMBAR UF is barium sulfate commercially available from Cimbar Performance Minerals (Cartersville, Ga., USA) (filler);

n-Butyl acetate commercially available from The Dow Chemical Company (Midland, Mich., USA) (organic solvent);

AROMATIC 150 commercially available from ExxonMobil Chemical Company (Houston, Tex., USA) (organic solvent);

Ethanol commercially available from Thermo Fisher Scientific Inc. (Waltham, Mass., USA) (organic solvent);

CYCAT 4040 is a 40% solution of p-toluenesulfonic acid in isopropanol commercially available from Cytec Industries Inc. (Woodland Park, N.J., USA) (acid catalyst);

Polyol A is DESMOPHEN C1100 which is commercially available from Bayer Corporation (Pittsburgh, Pa., USA);

Polyol B is DESMOPHEN CXP 2716 which is commercially available from Bayer Corporation;

Polyol C is PRIPLAST 3190 which is commercially available from Croda Inc. (Edison, N.J., USA); and CHDA=1-1,3/1,4-Cyclohexanedicarboxaldehyde, 96.1% solids with an equivalent weight (EW) of 79.2 (polyaldehyde).

Preparation of Acrylic Polyol Based Polycarbamate Examples

Acrylic Polyol Components

HEMA is hydroxyethyl methacrylate (ROCRYL 400 (HEMA-LA)) commercially available from The Dow Chemical Company;

2-EHA is 2-ethylhexyl acrylate commercially available from The Dow Chemical Company;

MMA is methyl methacrylate commercially available from The Dow Chemical Company;

Glacial Acrylic Acid—commercially available from The Dow Chemical Company;

t-BPAc is t-butyl peroxyacetate (LUPEROX 7M50) commercially available from Arkema, Inc. (King of Prussia, Pa.); and Xylenes are commercially available from Thermo Fisher Scientific Inc.

Acrylic Polyol A was an acrylic polyol with a solution OH EW of 576, a Tg of −13.1° C., and solids content of 74.8% in xylenes. Acrylic Polyol A is prepared according to the following process and based on the formulation components as follows: 30% HEMA, 56% 2-EHA, 13% MMA, 1% AA and 1.6% t-BPA.

Process for Preparing Acrylic Polyol a

Acrylic Polyol A was made in a 20-L 316 stainless steel reactor, equipped with dual 45 degree pitched blades, 1-inch thickness baffle cage, hot oil heating system, Mag-drive agitator, and three liquid feed tanks. The reactor was rated for 300 psi pressure capability at 482° F. Feed tank V-600 had a maximum capacity of 2550 ml and was used for xylenes. Feed tank V-602 had a maximum capacity of 3780 ml and was used for monomers solution. Feed tank V-601 had a maximum capacity of 2550 ml and was used for initiator solution.

HEMA, MMA, 2-EHA and AA monomers were weighed out and mixed well in a tank at room temperature. The monomer mix solution was used as one stream and fed from V-602 tank into the reactor. The t-BPA initiator solution came as 50 wt % in mineral spirits, and was diluted to 12.5 wt % with xylenes. The initiator solution was fed from V-601 into the reactor. The components were as shown in Table 1.

TABLE 1

| Chemicals | Loading (g) |
| --- | --- |
| 2-Ehtylhexyl acrylate (2-EHA) | 6202.6 |
| Methylmethacrylate (MMA) | 1439.7 |
| Hydroxyethyl methacrylate (HEMA) | 3323.3 |
| Acrylic acid (AA) | 110.8 |
| Xylenes | 2506.0 |
| t-butyl peroxyacetate (t-BPA), 12.5 wt % | 1417.6 |

Acrylic Polyol A was synthesized in a closed reactor. Due to the feeds of monomers and initiator, pressure built up to 80 psig at the end of the reaction. Prior to reaction, the reactor was pressure-tested multiple times with nitrogen to check for any leaks and remove oxygen. Once confirmed, the reactor was closed to all vents and no nitrogen sweep or sparging was performed during the reaction. 1628.9 g xylenes were charged into the reactor from V-600 tank and heated to the set point of 140° C. with 400 rpm mixing. Once at 140° C., monomer mix and initiator feeds were started at the same time and reaction started. The monomer mix solution was fed at a flow rate of 74 g/min, which allowed the delivery of all monomers over 150 min. The initiator solution was fed at a flow rate of 8.6 g/min, which allowed the delivery of initiator over 165 min. The 15 min difference between the two feeds was used as "initiator chase" time. The reaction was maintained at 140° C. and 400 rpm agitation. Once both feeds were completed, the reaction was maintained at 140° C. for another 30 min of digestion time. The reaction was completed and cooling process was started. Once the reaction mixture temperature was below 90° C., 877 g xylenes were charged into the reactor to dilute down to 75% solids content. When the mixture was cooled down below 60° C., the product was discharged through a 200 μm filter bag into a 5-gallon closed top metal pail for packaging.

Polycarbamate A Components

Acrylic Polyol A, prepared as described herein

Urea pellet, commercially available from Sigma Aldrich Co. LLC (St. Louis, Mo., USA)

Dibutyl tin oxide, commercial available from Arkema, Inc. (King of Prussia, Pa., USA)

Xylenes, commercially available from Thermo-Fisher Scientific.

Polycarbamate A was prepared using Acrylic Polyol A with a solution OH EW of 576 and solids content of 74.8%. Polycarbamate A had a $T_g$ of 11.6° C. and greater than 2 carbamate functional groups. Polycarbamate A was prepared according to the process described herein.

Process for Preparing Polycarbamate A

Polycarbamate A was synthesized in a 20-L stainless steel reactor, equipped with dual 45 degree pitched blades, 1-inch thickness baffle cage, hot oil heating system, Mag-drive agitator, two liquid feed tanks, packed bed column, condenser, nitrogen sparging and a collection tank. Feed tank V-602, maximum capacity of 3780 ml, was used for urea solution feed. Feed tank V-600, maximum capacity of 2550 ml, was used for xylenes feed. Urea pellets were dissolved in distilled water to make a 45 wt % urea solution, and the solution was used as a feed during the reaction. The components were as shown in Table 2.

TABLE 2

| Component | Loading (g) |
|---|---|
| Acrylic Polyol A | 14078.7 |
| Urea pellets | 1321.3 |
| Distilled water | 1614.9 |
| Dibutyl tin oxide | 92.4 |
| Xylenes | 1932.8 |

Acrylic Polyol A and dibutyl tin oxide were charged into 20-L reactor, and heated to the temperature set point of 140° C. under nitrogen sparging (0.75 standard cubic feet per hour, SCFH) and 400 rpm agitation. The packed bed column jacket was heated to 90° C. and city water was used for the condenser. Once the mixture temperature reached 140° C., urea solution was fed into the reactor and reaction started. Urea solution was fed at a flow rate of 8.16 g/min, which allowed the delivery of urea over 6 hrs into the reactor. The reaction was maintained at 140° C., 400 rpm agitation and 0.75 SCFH nitrogen sparging. During the reaction, water and xylenes formed a heterogeneous azeotrope which was removed from the reactor and collected through condenser. The heterogeneous azeotrope resulted in two liquid phases, water and xylenes. The water phase was discarded while the xylenes were recycled back into the reactor through V-600 pump to maintain the reaction mixture solids content. Once urea feed was complete, reaction was continued for at least 18 hr of digestion time at 140° C., 400 rpm agitation and 1.0 SCFH nitrogen sparging. The reaction process was monitored by $^{13}$C NMR for carbamate conversion and residual urea. 1932.8 g xylenes were charged into the reactor after 24 hr of reaction to dilute the solids content to 70%, and the reaction was continued for another 13 hr until the residual urea level was below 0.2 wt %. The cooling process was started and product was discharged through a 200 micron filter bag when below 60° C.

$^{13}$C NMR Analysis. A cryogenic $^{13}$C NMR method was developed to analyze the chemical composition of the final acrylic carbamate, including acrylic carbamate conversion. For NMR experiments, samples were dissolved in either $CDCl_3$ or DMSO-$d_6$ at room temperature. The typical solution concentration was 0.6~0.9 g sample in 2.2 mL of solvent. $Cr(acac)_3$ was added as a relaxation agent to shorten data acquisition time. $^{13}$C NMR experiments were performed on a Bruker Avance 400 MHz ($^1$H frequency) NMR spectrometer equipped with a 10 mm DUAL C/H cryoprobe. All experiments were carried out at room temperature without sample spinning Spectra were processed with NUTS program using a 1 Hz exponential filter for apodization. The following was the setup of acquisition parameters for inverse-gated $^{13}$C NMR experiments:

Temperature: 25.0° C. Solvent: $CDCl_3$ or DMSO-$d_6$
Acquisition: 512 scans Reference: 77.3 or 39.5 ppm for solvent Relaxation
delay: 8 s Spectrum center: 100 ppm
90° pulse length: 13.1 μs Spectral width: 300 ppm
Polycarbamate A had 80.5% hydroxyl conversion and contained 0.09 wt % residual urea.

Preparation of Master Batch Polycarbamate (Part A) for Inventive Coating Examples 1-4 (IE-1-4) and Comparative Coating Example A (CE-A)

Master batch preparation of Part A for Inventive Coating Examples 1-4 (IE-1-4) and Comparative Coating Example A (CE-A) containing pigments and fillers are prepared in a FlackTek SpeedMixer™ (Model DAC 150, FlackTek, Inc.) dual asymmetric centrifuge. The formulations are prepared based on the following process based on the formulation components listed in Table 3.

1. The polycarbamate polymer, Ti-PURE R900 and OPTI-WHITE are added to a max 100 SpeedMixer cup. The polymer and fillers are mixed by hand with a spatula to pre-wet the fillers.
2. The formulation is mixed for approximately 1 min at 3000 rpm and visually checked and then the contents on the side of the cup are mixed in by hand with a spatula.
3. Step 2 is repeated.
4. Step 2 is repeated again.
5. Approximately half of the silica is added to the cup and mixed by hand with a spatula to pre-wet the silica.
6. The formulation is mixed for approximately 1 min at 3000 rpm and visually checked and then the contents on the side of the cup are mixed in by hand with a spatula.
8. The remaining silica is added to the cup and mixed by hand with a spatula to pre-wet the silica.
9. The formulation is mixed for approximately 1 min at 3000 rpm and visually checked and then the contents on the side of the cup are mixed in by hand with a spatula.
10. Step 9 is repeated.
11. The AROMATIC 150 was added to the cup and mixed by hand with a spatula.
12. The formulation is mixed for approximately 1 min at 3000 rpm and visually checked and then the contents on the side of the cup are mixed in by hand with a spatula.
13. The n-butyl acetate and CYCAT 4040 are added to the cup and mixed by hand with a spatula.
14. The formulation was mixed for approximately 1 min at 3000 rpm and visually checked and then the contents on the side of the cup are mixed in by hand with a spatula.

TABLE 3

| Part A | |
|---|---|
| Material | Grams |
| Polycarbamate A | 72.0 |
| OPTIWHITE | 6.70 |
| R-900 (TiO2) | 6.10 |
| ACEMATT TS100 | 3.40 |
| CYCAT 4040 (catalyst) | 1.10 |
| SOLVESSO 150 | 12.0 |
| n-butyl acetate | 4.0 |

Preparation of Polyaldehyde plus Polyol (Part B) for Inventive Coating Examples 1-4 (IE-1-4)

The Inventive Coating Examples 1-4 (IE-1-4) were prepared in a FlackTek SpeedMixer™ (Model DAC 150, FlackTek, Inc.) dual asymmetric centrifuge. The formulations were prepared based on the following process based on the formulation components listed in Table 4.

1. The CHDA, ethanol (if present), and polyol are added to a max 20 speed mixer cup.
2. The formulation is mixed for approximately 1 min at 3000 rpm and visually checked and then the contents on the side of the cup are mixed in by hand with a spatula.

TABLE 4

| | IE-1 Grams | IE-2 Grams | IE-3 Grams | IE-4 Grams |
|---|---|---|---|---|
| CHDA | 1.2 | 1.2 | 1.2 | 1.2 |
| Ethanol | 1 | 1 | 1 | 0 |

TABLE 4-continued

|  | IE-1 Grams | IE-2 Grams | IE-3 Grams | IE-4 Grams |
|---|---|---|---|---|
| Polyol A | 0.8 | 0 | 0 | 0.8 |
| Polyol B | 0 | 0.8 | 0 | 0 |
| Polyol C | 0 | 0 | 0.8 | 0 |

Coating Formulation Preparation for Inventive Coating Examples 1-4 (IE-1-4) and Comparative Coating Example A (CE-A)

The Inventive Coating Examples 1-4 (IE-1-4) and Comparative Coating Example A (CE-A) are prepared in a FlackTek SpeedMixer™ (Model DAC 150, FlackTek, Inc.) dual asymmetric centrifuge.

Inventive Coating Example IE-1

1. To the max 20 speed mixer cup containing IE-1 Part B, 17.6 g of Part A is added and 0.3 gram of ethanol.
2. The formulation is mixed for approximately 1 min at 3000 rpm and visually checked and then the contents on the side of the cup are mixed in by hand with a spatula.

Inventive Coating Example IE-2

1. To the max 20 speed mixer cup containing IE-2 Part B, 17.6 g of Part A is added and 0.3 gram of ethanol.
2. The formulation is mixed for approximately 1 min at 3000 rpm and visually checked and then the contents on the side of the cup are mixed in by hand with a spatula Inventive Coating Example IE-3

1. To the max 20 speed mixer cup containing IE-3 Part B, 17.6 g of Part A is added and 0.3 gram of ethanol.
2. The formulation is mixed for approximately 1 min at 3000 rpm and visually checked and then the contents on the side of the cup are mixed in by hand with a spatula.

Inventive Coating Example IE-4

1. To the max 20 speed mixer cup containing IE-4 Part B, 17.6 g of Part A is added and 1.3 grams of ethanol.
2. The formulation is mixed for approximately 1 min at 3000 rpm and visually checked and then the contents on the side of the cup are mixed in by hand with a spatula.

Comparative Coating Example CE-A

1. Add 1.2 g of CHDA to a max 20 speed mixer cup, add 17.6 g of Part A and 1.3 grams of ethanol.
2. The formulation is mixed for approximately 1 min at 3000 rpm and visually checked and then the contents on the side of the cup are mixed in by hand with a spatula.

Substrate Preparation

Using commercially available paper towel, iron phosphate treated steel substrates (Type R-412-I, size: 4×12×0.032 inch) and chromate treated aluminum substrates (AL412, size: 4×12×0.025 inch) available from Q-panel company are cleaned with isopropanol thoroughly and then air-dried.

Inventive Coated Substrates 1-4 (ICS-1-4) and Comparative Coated Substrate A (CCS-A)

The coating formulations were applied to substrates using the 15 mils coating applicator (#24 8-path coating applicator from P.G.&T.CO.) to achieve 2-3 mils coating dry film thickness. The coating formulations were cured in the humidity control room (50% Relative Humidity, ~24° C.) for 7 days before testing; thereby forming ICS-1-4 and CCS-A. The properties of ICS-1-4 and CCS-A were tested, and the results are reported in Table 5.

TABLE 5

|  | ICS-1 | ICS-2 | ICS-3 | ICS-4 | CCS-A |
|---|---|---|---|---|---|
| Konig Hardness [sec] | 36 | 37 | 45 | 35 | 56 |
| MEK Resistance [double rubs] 25% Film Loss | >200 | >200 | >200 | >200 | >200 |
| X-Hatch Adhesion | 5B | 5B | 5B | 5B | 5B |
| Water Resistance (24 hr) covered | 5 | 5 | 5 | 5 | 5 |
| Mandrel Bend (0.5") | P | P | P | P | P |
| Impact Resistance - Direct (in/lbs) | 80 | 70 | 70 | 90 | 30 |

These examples illustrate using a diol improves the flexibility and toughness (improvement in impact resistance) of the coating without negatively affecting the other coating properties.

Preparation of Alkyd Polyol Based Polycarbamate Examples

Preparation of Alkyd Polyol Based Polycarbamate Examples

Alkyd Polyol A Components
Pentaerythritol (PE), commercially available from Perstorp, Inc. (Toledo, Ohio, USA);
Trimethylolethane (TME), commercially available from Geo Specialty Chemicals, Inc. (Ambler, Pa., USA);
Isophthalic acid (PIA), commercially available from Eastman Chemical Company (Kingsport, Tenn., USA);
Laurie acid, commercially available from WEGO Chemical & Mineral Corp. (Great Neck, N.Y., USA);
Oleic acid, commercially available from Eastman Chemical Company (Kingsport, Tenn., USA); Mono butyl tin oxide (MBTO), commercially available from Arkema, Inc. (King of Prussia, Pa., USA);
Dibutyl tin oxide (DBTO), commercially available from Arkema, Inc. (King of Prussia, Pa., USA); and
Xylenes, commercially available from Thermo Fisher Scientific Inc. (Waltham, Mass., USA).
Process for Preparing Alkyd Polyol A
Alkyd Polyol A was made in a 20-L 316 stainless steel reactor, equipped with dual 45 degree pitched blades, 1-inch thickness baffle cage, hot oil heating system, Mag-drive agitator, liquid feed tank, nitrogen sparging, packed bed column and condenser. Feed tank V-600 had a maximum capacity of 2550 ml and was used for xylenes. The components were as shown in Table 6.

TABLE 6

| Component | Loading (g) |
|---|---|
| Isophthalic acid | 3905.7 |
| Pentaerythritol | 2169.8 |

TABLE 6-continued

| Component | Loading (g) |
|---|---|
| Trimethylolethane | 1549.9 |
| Oleic acid | 1937.3 |
| Lauric acid | 1937.3 |
| Xylenes | 3250 |
| Dibutyl tin oxide | 8.63 |
| Monobutyl tin oxide | 8.63 |

Prior to reaction, the reactor was nitrogen pressure-tested multiple times to check for any leaks. Lauric acid and oleic acid were first charged into the reactor at reactor jacket temperature set point of 100° C. Agitation was maintained at 200 rpm with nitrogen sparging at 1 standard cubic feet per hour (SCFH). After the mixture temperature reached over 50° C., isophthalic acid, pentaerythritol, trimethylolethane, dibutyl tin oxide and monobutyl tin oxide were charged into the reactor. Agitation was ramped up to 400 rpm and temperature set point was changed to 220° C. on internal temperature control. Packed bed column jacket temperature was set to 90° C., and city water was used for condenser. When reaction mixture temperature was over 170° C., reaction started at a faster rate and water was removed through packed bed column and condenser as a reaction byproduct to drive reaction forward. The reaction mixture temperature gradually approached 220° C. and reaction continued. Samples were taken periodically and analyzed for acid value. Acid value was used to determine the reaction progress (target acid value was 5). When the target acid value was imminent (~7), the reactor was cooled down, allowing a final drift of the acid value to its final stropping point at a temperature below 140° C. As the temperature drifted down from 220 to 140° C., the progress of the reaction slowed and eventually stopped. Once the reactor contents cooled below 100° C., xylenes were charged from V-600 feed tank into the reactor to reach solids content of 75%. The product was discharged into a lined 5 gallon pail. The resulting Alkyd Polyol A had a solution OH equivalent weight of 391.9 g/equivalent and solids content of 73.7% in xylenes.

Acid Value Titration. Approximately 2-4 g of sample was weighed into an Erlenmeyer flask and dissolved in a 50/50 mix of isopropanol/xylene (about 25 ml), which required a small amount of heat (hot plate with stirrer). The fully dissolved sample was then titrated to a phenolphthalein endpoint with 0.1M KOH solution. The acid value was calculated by multiplying the ml of KOH used by 5.61 and dividing the result by the sample weight:

$$AV(\text{mg KOH/g sample}) = \frac{\text{ml } 0.1M \text{ KOH titrant} \times 5.61}{\text{g sample}}$$

Alkyd Polycarbamate Components
Acrylic Polyol A, prepared as described herein;
Urea pellet, commercially available from Sigma-Aldrich Corp. (St. Louis, Mo., USA);
Dibutyl tin oxide, commercially available from Arkema, Inc. (King of Prussia, Pa., USA); and
Xylenes, commercially available from Thermo Fisher Scientific Inc. (Waltham, Mass., USA).
Process for Preparing Alkyd Polycarbamate A Alkyd Polycarbamate A was synthesized in a 20-L stainless steel reactor, equipped with dual 45 degree pitched blades, 1-inch thickness baffle cage, hot oil heating system, Mag-drive agitator, two liquid feed tanks, packed bed column, condenser, nitrogen sparging and a collection tank. Feed tank V-602, maximum capacity of 3780 ml, was used for urea solution feed. Feed tank V-600, maximum capacity of 2550 ml, was used for xylenes feed. Urea pellets were dissolved in distilled water to make a 45 wt % urea solution, and the solution was used as a feed during the reaction. The components were as shown in Table 7.

TABLE 7

| Chemicals | Loading (g) |
|---|---|
| Alkyd Polyol A | 13333.0 |
| Urea pellets | 1267.0 |
| Distill water | 1548.6 |
| Dibutyl tin oxide | 87.6 |

Alkyd Polyol A and dibutyl tin oxide were charged into 20-L reactor, and heated to the temperature set point of 140° C. under nitrogen sparging (0.75 standard cubic feet per hour, SCFH) and 400 rpm agitation. The packed bed column jacket was heated to 90° C. and city water was used for the condenser. Once the mixture temperature reached 140° C., urea solution was fed into the reactor and reaction started. Urea solution was fed at a flow rate of 7.82 g/min, which allowed the delivery of urea over 6 hrs into the reactor. The reaction was maintained at 140° C., 400 rpm agitation and 0.75 SCFH nitrogen sparging. During the reaction, water and xylenes formed a heterogeneous azeotrope which was removed from the reactor and collected through condenser. The heterogeneous azeotrope resulted in two liquid phases, water and xylenes. The water phase was discarded while the xylenes were recycled back into the reactor through V-600 pump to maintain the reaction mixture solids content. Once urea feed was complete, reaction was continued for at least 18 hr of digestion time at 140° C., 400 rpm agitation and 1.0 SCFH nitrogen sparging. The reaction process was monitored by $^{13}C$ NMR for carbamate conversion and residual urea. After 24 hr of reaction time, the reactor contents were cooled down and product was discharged into a 5 gallon pail. The resulting Alkyd Polycarbamate A had greater than 2 carbamate functional groups.

$^{13}C$ NMR. A cryogenic $^{13}C$ NMR method was developed to analyze the chemical composition of the final alkyd carbamate, including alkyd carbamate conversion. For NMR experiments, samples were dissolved in either $CDCl_3$ or DMSO-$d_6$ at room temperature. The typical solution concentration was 0.6~0.9 g sample in 2.2 mL of solvent. $Cr(acac)_3$ was added as a relaxation agent to shorten data acquisition time. $^{13}C$ NMR experiments were performed on a Bruker Avance 400 MHz ($^1H$ frequency) NMR spectrometer equipped with a 10 mm DUAL C/H cryoprobe. All experiments were carried out at room temperature without sample spinning. Spectra were processed with NUTS program using a 1 Hz exponential filter for apodization. The following was the setup of acquisition parameters for inverse-gated $^{13}C$ NMR experiments:
Temperature: 25.0° C. Solvent: $CDCl_3$ or DMSO-$d_6$
Acquisition: 512 scans Reference: 77.3 or 39.5 ppm for solvent Relaxation
delay: 8 s Spectrum center: 100 ppm
90° pulse length: 13.1 µs Spectral width: 300 ppm
Alkyd Polycarbamate A had 59.7% hydroxyl conversion and contained 0.22 wt % residual urea.

Coatings prepared from Alkyd Polycarbamate A, IE-5, IE-6 and CE-B and Inventive Coated Substrates prepared therefrom, ICS-5, ICS-6 and CCS-B, respectively, were also examined. Table 8 provides the formulation of the alkyd polycarbamate masterbatches for each of IE-5, IE-6 and CE-B. Table 9 provides the MEK Resistance and Pendulum Hardness for each of these examples.

TABLE 8

| CE-B | % by wt. | IE-5 | % by wt. | IE-6 | % by wt. |
|---|---|---|---|---|---|
| Alkyd Polycarbamate A | 42.17 | Alkyd Polycarbamate A | 35.88 | Alkyd Polycarbamate A | 39.28 |
| n-butyl acetate | 22.48 | n-butyl acetate | 27.10 | n-butyl acetate | 24.00 |
| Ethanol | 25.35 | Ethanol | 21.57 | Ethanol | 23.61 |
| p-TSA | 0.98 | p-TSA | 0.83 | p-TSA | 0.91 |
| CHDA | 9.02 | CHDA | 7.67 | CHDA | 8.40 |
| CHDM | 0.00 | CHDM | 6.95 | CHDM | 3.80 |

TABLE 9

| | MEK Double Rubs | Pendulum Hardness (sec) |
|---|---|---|
| CE-B | 100 | 159 |
| IE-5 | 190 | 155 |
| IE-6 | 300 | 153 |

Additional inventive coating examples prepared from alkyd polycarbamates, IE-7, IE-8 and CE-C were prepared using alkyd polycarbamate masterbatches having the formulations shown in Table 10.

TABLE 10

| | CE-C | IE-7 | IE-8 |
|---|---|---|---|
| Alkyd Polycarbamate A | 43.1 | 39.0 | 40.2 |
| n-butyl acetate | 20.8 | 24.7 | 23.2 |
| Ethanol | 25.9 | 17.5 | 24.1 |
| p-TSA | 1.0 | 0.9 | 0.9 |
| CHDA | 9.2 | 8.3 | 8.6 |
| PRIPLAST 3190 | 0.0 | 9.5 | 3.0 |

TABLE 11

| | Direct Impact (inch-pounds) | Reverse Impact (inch-pounds) | Conical Mandrel (mm) |
|---|---|---|---|
| CE-C/CCS-E | 40 | 0 | 61 |
| IE-7/CE-7 | 160 | 160 | 0 |
| IE-8/CE-8 | 80 | 100 | 0 |

Test Methods

Test methods include the following:
OH Number Titration

Where OH # is the magnitude of the hydroxyl number for a polyol as expressed in terms of milligrams potassium hydroxide per gram or polyol (mg KOH/g polyol). Hydroxyl number (OH #) indicates the concentration of hydroxyl moieties in a composition of polymers, particularly polyols. The hydroxyl number for a sample of polymers is determined by acetylation with pyridine and acetic anhydride in which the result is obtained as a difference between two titrations with potassium hydroxide solution, one titration with a blank for reference and one titration with the sample. A hydroxyl number is the weight of potassium hydroxide in milligrams that will neutralize the acetic anhydride capable of combining by acetylation with one gram of a polyol. A higher hydroxyl number indicates a higher concentration of hydroxyl moieties within a composition. A description of how to determine a hydroxyl number for a composition is well-known in the art, for example in Woods, G., The ICI Polyurethanes Book, $2^{nd}$ ed. (ICI Polyurethanes, Netherlands, 1990). Hydroxyl equivalent weight (OH EW) is calculated using the following formula $$OH\ EW = 56100/OH\#$$

Percent Solids (Polycarbamate or Polyol)

Approximately 0.5 g of polymer is weighed into an aluminum weighing dish. Approximately 1 ml of toluene is added to the aluminum weighing dish. Duplicate weighing dishes are prepared and placed in a 105° C. oven for greater than 4 hours. The percent solids are calculated using the following formula:

% Solids=100×(final sample weight/initial sample weight)

The percent solids are an average of the duplicate samples.
Pendulum Hardness

Pendulum hardness testing is performed according to ASTM D4366 method, and average of 3 measurements are averaged and reported.
Cross-Hatch Adhesion Cross-hatch adhesion was measured and rated according to ASTM D-3359. Specific ASTM ratings for the adhesion test are shown in Table 8 below. Adhesion ratings of 4B and 5B are desired.

TABLE 8

| ASTM D-3359 Classification for Adhesion | |
|---|---|
| Rating | Percent of Coating Removed |
| 5B | 0% (Perfect adhesion) |
| 4B | <5% |
| 3B | 5-15% |
| 2B | 15-35% |
| 1B | 35-65% |
| 0B | >65% |

MEK Double Rubs

Test solvent resistance according to ASTM D7835 using Methyl Ethyl Ketone (MEK) and a mechanical rubbing machine. Test samples are clamped into place in the double rubbing machine set with a stroke length of approximately 8" at a rate of 80 double rubs per minute. A double layer of cotton cheesecloth attached to the mechanical finger that is pre-saturated with MEK. The coating is visually monitored during the test for any signs of damage or delamination at which point the number of double rubs is recorded.
Water Resistance Water resistance was tested by exposing the coatings to DI water, with methodology similar to ASTM D1308. A big DI water droplet was placed on the coating surface and covered with a watch glass for 24 hrs. After 24 hrs, the water was wiped off the coating. The coating was visually inspected for any signs of color change, staining, blistering, etc. The coating was rated as a 5 (no effect) through 1 (severe blistering or completely dissolved).
Impact Resistance The impact resistance of the coating was determined by using a Gardner impact tester according to ASTM D2794.
Mandrel Bend test Mandrel Bend data in Table 5 was obtained according to the following method: The mandrel bend test is to evaluate the coating's resistance to cracking (flexibility). The coated panels are bent over a mandrel and the resistance to cracking of the coating is determined. The results are recorded if the coating pass or fail the mandrel with 0.5' diameter.

Conical

The Conical Mandrel data in Table 11 was obtained according to the following method: The mandrel bend test is to evaluate the coating's resistance to cracking (flexibility). Test mandrel wedge bend flexibility of the coating layer using a conical mandrel following ASTM D522-93a. Measurements are in millimeters from the small end of the mandrel to where cracking has ceased.

We Claim:

1. A crosslinkable composition comprising: (i) one or more polycarbamates; (ii) one or more polyaldehydes; (iii) one or more polyols; and (iv) an acid catalyst;
wherein the one or more polyols are selected from the group consisting of 1,4-butanediol, 1,5-pentanediol, 1,6-hexanediol and 1,4-cyclohexanedimethanol, linear aliphatic polycarbonate polyesters, linear aliphatic polycarbonate diol, and linear aliphatic polyester polyols.

2. The crosslinkable composition according to claim 1, further comprising a polyisocyanate.

3. The crosslinkable composition according to claim 1, wherein component (iii) is a linear aliphatic polycarbonate polyester having a weight average molecular weight from 800 to 1200 daltons.

4. The crosslinkable composition according to claim 1, wherein component (iii) is a linear aliphatic polycarbonate diol having a weight average molecular weight from 450 to 850 daltons.

5. A crosslinked composition produced by curing the crosslinkable composition according to claim 1, wherein the curing occurs at a temperature from 0 to 80° C.

6. A coating composition comprising the crosslinked composition according to claim 5.

7. An article comprising a substrate and a coating composition according to claim 6.

8. The article according to claim 7, wherein the substrate is one or more selected from the group consisting of woods, composites, concretes, metals, and plastics.

9. A method of making a crosslinkable composition comprising: selecting (i) one or more polycarbamates; selecting (ii) one or more polyaldehydes; selecting (iii) one or more polyols; and mixing components (i)-(iii) in any order; wherein the one or more polyols are selected from the group consisting of 1,4-butanediol, 1,5-pentanediol, 1,6-hexanediol and 1,4-cyclohexanedimethanol, linear aliphatic polycarbonate polyesters, linear aliphatic polycarbonate diol, and linear aliphatic polyester polyols.

10. The method of making a crosslinkable composition according to claim 9 wherein components (ii) and (iii) are mixed together prior to addition to component (i).

11. The coating composition according to claim 6, wherein the coating composition exhibits an improvement in direct impact resistance of at least 50% over the impact resistance of a comparative coating having the same composition with the exception that the comparative coating is produced from a crosslinkable composition which is produced from a crosslinkable composition with no polyol.

12. The coating composition according to claim 6, wherein the coating composition exhibits an improvement in MEK resistance of at least 50% over the impact resistance of a comparative coating having the same composition with the exception that the comparative coating is produced from a crosslinkable composition which is produced from a crosslinkable composition with no polyol.

* * * * *